UNITED STATES PATENT OFFICE 1,985,248

COLORATION OF MATERIALS

George Holland Ellis, Tobias Ockman, and Henry Charles Olpin, Spondon, near Derby, England, assignors to Celanese Corporation of America, a corporation of Delaware No Drawing. Application May 6, 1930, Serial No. 450,308. In Great Britain June 25, 1929

19 Claims. (Cl. 8—5)

This invention relates to the treatment of materials and especially of materials such as filaments, fibres, threads, fabrics or films made of or containing cellulose esters or ethers to obtain fast colorations.

We have found that colorations such as dyeings, printings or stencillings produced with certain anthraquinone derivatives, and particularly those containing free amino, alkylamino or arylamino groups, whether or not such anthraquinone derivatives contain other nuclear substituents, lack fastness to the combined agencies of acid and light. In view of the fact that commercial treatments frequently entail subjecting the materials to acid treatments, this lack of fastness constitutes a serious drawback to the use of anthraquinone derivatives, and particularly those specified.

We have found that the fastness of colorations produced with anthraquinone derivatives, and particularly those containing free amino or alkyl (including aralkyl) amino groups, that is anthraquinone derivatives containing at least one substituent group of the type $NR_1R_2$ where $R_1R_2$ represent hydrogen or alkyl (including aralkyl) groups, may be improved by means of alkyl (including aralkyl) derivatives of urea, thiourea or guanidine. It is to be understood that the term "alkyl" as used in the claims includes also "aralkyl". Urea, thiourea and guanidine are compounds having the formula

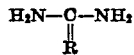

where R represents O, S or NH. We have further found that a treatment with these bodies may be of advantage in connection with colorations produced with dyestuffs other than anthraquinone derivatives.

Accordingly the present invention comprises broadly a process for the treatment of materials by incorporating therein one or more of the above substances before, after or together with the coloration thereof. The following compounds may be instanced as examples:—tetramethyl thiourea, di-isoamyl thiourea, dibenzyl thiourea, tetramethyl urea, di-isoamyl urea, and dimethyl guanidine. The compounds which are relatively non-volatile, for example those containing long alkyl chains, appear to be the most efficacious.

The improvement in the fastness of colorations and particularly colorations produced with the above anthraquinone derivatives by means of the said organic compounds may be still further accentuated by the simultaneous or separate application to the materials of inorganic compounds having an alkaline reaction, that is to say substances which are alkaline and contain an inorganic base, for example sodium carbonate, borax, disodium hydrogen phosphate, sodium acetate, sodium palmitate or potassium oleate.

As with the organic substances referred to above and hereinafter termed for the sake of brevity ureoid bases, the inorganic alkalies may be applied before, after or during the coloration. Most conveniently they are applied either during dyeing or otherwise coloring, or during a finishing or other after treatment. In the treatment of materials made of or containing cellulose esters such inorganic substances are preferably not sufficiently basic or alkaline or are not applied in sufficient concentration to produce a deleterious degree of hydrolysis of the cellulose ester.

The ureoid bases themselves may be applied in any suitable manner. For example in the treatment of materials containing cellulose esters or ethers they may be absorbed from aqueous solutions of their salts, for example their hydrochlorides. Guanidine carbonate we find a particularly useful salt for this method of application. Alternatively they may be applied in the form of aqueous dispersions produced in any suitable manner, for instance by the methods described in prior U. S. Patents Nos. 1,618,413, 1,618,414, 1,694,413, 1,690,481, 1,716,721, 1,803,008, 1,840,572, 1,928,647, and U. S. application No. 390,424, filed September 4, 1929. The preparations containing the ureoid bases with dispersing agents and/or protective colloids form an important part of the present invention. The preparations may be in solid, powdered, paste or more or less concentrated liquid form. Again, where possible, the ureoid bases may be applied in true solution, e. g. in aqueous or alcoholic or other organic solution. Treatment with solutions or dispersions containing up to 2%, e. g. 0.2–1% of the bases gives very much improved fastness.

Compositions of matter may be made up containing the ureoid bases together with the coloring matters, and particularly the coloring matters of the anthraquinone series containing free amino, alkyl (including aralkyl) amino or arylamino groups. Such compositions, which preferably contain the ureoid base and the dyestuff in dispersed form, produced for example by means of any of the dispersing agents mentioned in the prior specifications referred to, also form part of the present invention. They may be applied directly for the coloration of the materials in fast shades.

A further method of incorporating the ureoid bases in artificial materials, and particularly artificial materials made of or containing cellulose acetate or other cellulose esters or ethers, consists in dissolving or otherwise incorporating the ureoid bases in the spinning solutions used for the manufacture of the materials. Thus for example an acetone solution of cellulose acetate containing up to 2% of di-isoamyl thiourea or other ureoid base (on the weight of the cellulose acetate) may be spun according to dry spinning methods to produce cellulose acetate filaments or yarns which are capable of being directly dyed in fast shades with the anthraquinone dyestuffs.

As already indicated the invention is of particular value in rendering fast to the combined agencies of light and acid colorations produced with anthraquinone derivatives, and especially those containing free amino, alkyl (including aralkyl) amino or arylamino groups. For this reason the process is most valuable in connection with the treatment of materials made of cellulose acetate or other cellulose esters or ethers, for instance cellulose formate, cellulose propionate, cellulose butyrate or methyl, ethyl or benzyl cellulose, or materials containing such cellulose derivatives associated with other fibres, such as wool, cotton or silk. The invention may however be applied to the treatment of materials consisting wholly of wool or silk or other fibres.

The following examples illustrate the best methods known to us for carrying the invention into effect but they are not to be considered as limiting the invention in any way:—

*Example 1*

10 lbs. of a 10% aqueous paste of 1:4 dimethylamino-anthraquinone are mixed with 3 lbs. of 50% Turkey red oil, diluted with boiling soft water, and added through a filter cloth to a dyebath containing 300 gallons of warm soft water. 2 lbs. of di-isoamyl thiourea are dispersed by warming with 10 lbs. of 50% Turkey red oil, and diluted cautiously with 10 gallons of hot water with stirring, to obtain a clear dispersion, which is also added to the dyebath. 100 lbs. of cellulose acetate knitted fabric, previously scoured, are now entered, and dyeing effected by raising the temperature of the dyebath to 75–80° C., and maintaining it thereabouts for 1½ hours. The goods, which have absorbed both dyestuff and protective agent, are now lifted, rinsed and dried or otherwise treated as requisite.

*Example 2*

Cellulose acetate woven fabric, previously colored blue by application of 1% of diamino-chrysazin on the weight of goods, is passed through a solution containing 2 grams per litre of tetramethyl-thiourea and 0.5 grams per litre of borax in a suitable machine, the nip being so adjusted that the fabric retains its own weight of liquor. The fabric is then dried without rinsing.

*Example 3*

Cellulose acetate woven fabric, previously colored blue-violet by application of 1% of 1-methylamino-4-amino-anthraquinone on the weight of goods, is passed through a 2% aqueous solution of guanidine carbonate in a suitable machine, the nip being so adjusted that the fabric retains its own weight of liquor. The fabric is then dried without rinsing.

What we claim and desire to secure by Letters Patent is:—

1. Process for improving the fastness of colorations on materials, comprising incorporating in the materials at any stage of their manufacture an alkyl derivative of a compound having the formula

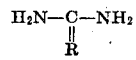

where R represents O, S or NH, and retaining such derivative in the material during subsequent treatment.

2. Process for improving the fastness on materials of colorations produced with anthraquinone derivatives containing at least one substituent group of the type $NR_1R_2$, where $R_1$ and $R_2$ represent hydrogen or alkyl groups, comprising incorporating in the materials at any stage of their manufacture an alkyl derivative of a compound having the formula

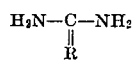

where R represents O, S or NH, and retaining such derivative in the material during subsequent treatment.

3. Process for improving the fastness on materials containing organic derivatives of cellulose of colorations produced with anthraquinone derivatives containing at least one substituent group of the type $NR_1R_2$, where $R_1$ and $R_2$ represent hydrogen or alkyl groups, comprising incorporating in the materials at any stage of their manufacture an alkyl derivative of a compound having the formula

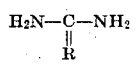

where R represents O, S or NH, and retaining such derivative in the materials during subsequent treatment.

4. Process for improving the fastness on materials containing cellulose acetate of colorations produced with anthraquinone derivatives containing at least one substituent group of the type $NR_1R_2$, where $R_1$ and $R_2$ represent hydrogen or alkyl groups, comprising incorporating in the materials at any stage of their manufacture an alkyl derivative of a compound having the formula

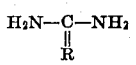

where R represents, O, S or NH, and retaining such derivative in the materials during subsequent treatment.

5. Process according to claim 4 in which the alkyl derivative is di-iso-amyl-thiourea.

6. Process according to claim 4 in which the alkyl derivative is tetra-methyl thiourea.

7. Process for improving the fastness on materials containing cellulose acetate of colorations produced with an anthraquinone derivative containing at least one substituent group of the type $NR_1R_2$, where $R_1$ and $R_2$ represent hydrogen or alkyl groups, comprising incorporating in the materials at any stage of their manufacture an alkyl derivative of a compound having the formula

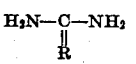

where R represents O, S or NH, in a proportion of up to 2% of the weight of the material, and retaining such derivative in the materials during subsequent treatment.

8. Finished textile materials colored with dyestuffs normally having poor fastness to the combined agencies of acid and light and containing an alkyl derivative of a compound having the formula

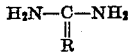

where R represents O, S or NH.

9. Finished materials colored with an anthraquinone derivative containing at least one substituent group of the type $NR_1R_2$, where $R_1$ and $R_2$ are hydrogen or alkyl groups, and containing an alkyl derivative of a compound having the formula

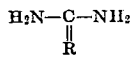

where R represents O, S or NH.

10. Finished materials containing an organic derivative of cellulose, colored with an anthraquinone derivative containing at least one substituent group of the type $NR_1R_2$, where $R_1$ and $R_2$ are hydrogen or alkyl groups, and containing an alkyl derivative of a compound having the formula

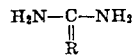

where R represents O, S or NH.

11. Finished materials containing cellulose acetate, colored with an anthraquinone derivative containing at least one substituent group of the type $NR_1R_2$, where $R_1$ and $R_2$ are hydrogen or alkyl groups, and containing an alkyl derivative of a compound having the formula

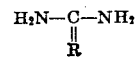

where R represents O, S or NH.

12. Finished materials containing cellulose acetate, colored with an anthraquinone derivative containing at least one substituent group of the type $NR_1R_2$, where $R_1$ and $R_2$ are hydrogen or alkyl groups, and containing up to 2% of an alkyl derivative of a compound having the formula

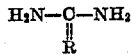

where R represents O, S or NH.

13. Materials according to claim 12 in which the alkyl derivative is tetramethyl thiourea.

14. Materials according to claim 12 in which the alkyl derivative is di-isoamyl thiourea.

15. A composition of matter containing an insoluble dyestuff normally having a poor fastness to the combined agencies of acid and light, an insoluble alkyl derivative of a compound having the formula

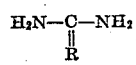

where R represents O, S or NH, and a substance capable of assisting the formation of a dispersion of the said dyestuff.

16. A composition of matter containing an insoluble dyestuff normally having a poor fastness to the combined agencies of acid and light, an insoluble alkyl derivative of a compound having the formula

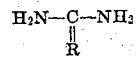

where R represents O, S or NH, and a dispersing agent.

17. A composition of matter according to claim 16, in which the alkyl derivative is di-isoamyl-thiourea.

18. A composition of matter according to claim 16, in which the alkyl derivative is tetramethyl-thiourea.

19. A composition of matter according to claim 16, in which the insoluble dyestuff is an anthraquinone derivative containing at least one substituent group of the type $NR_1R_2$, where $R_1$ and $R_2$ are hydrogen or alkyl groups.

GEORGE HOLLAND ELLIS.
TOBIAS OCKMAN.
HENRY CHARLES OLPIN.